United States Patent [19]
Patel

[11] Patent Number: 5,550,669
[45] Date of Patent: Aug. 27, 1996

[54] FLEXURE DESIGN FOR A FAST STEERING SCANNING MIRROR

[75] Inventor: Bhikhu Patel, Orlando, Fla.

[73] Assignee: Martin Marietta Corporation, Bethesda, Md.

[21] Appl. No.: 47,485

[22] Filed: Apr. 19, 1993

[51] Int. Cl.⁶ .................................................. G02B 26/08
[52] U.S. Cl. ............................ 359/224; 359/199; 248/485
[58] Field of Search ................................. 359/197–199, 359/223–226, 872, 876; 248/178, 476, 638, 609, 610, 179, 200.1, 205.3, 218.4, 219.1, 327, 479, 481, 485, 278; 74/99 R, 484 R–487

[56] References Cited

U.S. PATENT DOCUMENTS

| | | | |
|---|---|---|---|
| 3,532,408 | 10/1970 | Dostal | 359/199 |
| 3,928,778 | 12/1975 | Ivanov et al. | 310/8.3 |
| 3,964,336 | 6/1976 | Harmening | 359/224 |
| 3,981,566 | 9/1976 | Frank et al. | 359/872 |
| 4,025,203 | 5/1977 | Lee | 359/872 |
| 4,157,861 | 6/1979 | Davies | 359/872 |
| 4,203,654 | 5/1980 | Ellis | 359/872 |
| 4,708,420 | 11/1987 | Liddiard | 359/213 |
| 4,732,440 | 3/1988 | Gadhok | 359/223 |
| 4,810,079 | 3/1989 | Hartlage | 359/876 |
| 4,891,526 | 1/1990 | Reeds | 250/442.1 |
| 4,917,484 | 4/1990 | Heinz | 359/224 |
| 4,941,740 | 7/1990 | Sigman | 359/876 |
| 4,973,145 | 11/1990 | Kirkwood et al. | 359/872 |
| 5,004,205 | 4/1991 | Brown et al. | 248/476 |
| 5,015,831 | 5/1991 | Eastman et al. | 235/462 |
| 5,062,150 | 10/1991 | Swanson et al. | 359/152 |
| 5,063,464 | 11/1991 | Astheimer et al. | 360/104 |
| 5,064,259 | 11/1991 | Frank | 359/212 |
| 5,079,641 | 1/1992 | Marino et al. | 359/224 |
| 5,212,582 | 5/1993 | Nelson | 359/224 |

FOREIGN PATENT DOCUMENTS 61-132919  6/1986  Japan ..................... 359/224

*Primary Examiner*—James Phan
*Attorney, Agent, or Firm*—Burns, Doane, Swecker & Mathis

[57] ABSTRACT

A support for a fast steering/scanning mirror including a base and two horizontal flexures arranged generally parallel to each other. Each of the flexures may include two end brackets which are secured to the base and a middle bracket between the end brackets which is secured to the mirror. The support may also include a vertical flexure secured to the base at one end and pivotally secured with adhesive to the mirror between the two horizontal flexures at another end. The support may have a first natural vibrational mode with respect to rotation in each of two perpendicular axes that is less than 30 Hertz, a second natural vibrational mode with respect to rotation in each of the two perpendicular axes that is at least 2,000 Hertz, and a natural vibrational mode with respect to rotation in a third axis which is perpendicular to said two axes that is at least 2,000 Hertz. The vertical flexure may include at least two plates which are orthogonally arranged on the same axis. The horizontal flexures may include a mustache-shaped edge having a straight portion near a middle of the horizontal flexure which is joined by a slanted portion at each end which is joined at each end by a curved portion. The horizontal flexures may also include at least one folded edged opposite said mustache-shaped edge.

37 Claims, 17 Drawing Sheets

FLEXURE DESIGN FOR A FAST STEERING SCANNING MIRROR

FIELD OF THE INVENTION

The present invention generally relates to optical systems for light beam deflection using a moving element or medium, such as a reflective element.

BACKGROUND OF THE DISCLOSURE

Although the human eye can sense only those images which are formed by visible light, similar images are also created by invisible forms of electromagnetic radiation such as x-ray, ultraviolet, and infrared radiation. In fact, many objects spontaneously emit various forms of radiation which, like reflected visible light, produce vivid images. For example, the nighttime sky includes images formed by visible light from the sun which is reflected off of the moon and visible light which is spontaneously emitted by all of the other stars. The sun and the stars also emit invisible radiation, including infrared or thermal radiation, which creates images that the human eye is incapable of sensing. In general, all warm objects emit some form of infrared radiation that produces a thermal image.

Devices which sense these thermal images have proven to be quite useful in scientific, commercial, and military applications ranging from non-destructive testing and pollution monitoring to target acquisition. For many of these applications, the images are observed from remote positions during what are generally referred to as "heat surveys." A typical aerial heat survey is illustrated in FIG. 1 where reflected and emitted infrared radiation from the ground are collected by an imaging system on board aircraft 2.

At any one time during the survey in FIG. 1, the static field of view for the imaging system in aircraft 2 will be limited to just one small area on the ground depicted by the ground resolution element 4. However, the overall field of view for the imaging system can be significantly increased by rolling the aircraft 2 from side to side in order to scan a much wider area 6. Since the aircraft is also moving forward while the imaging system is scanning from side to side, a total dynamic field of view 8 can be observed with each pass of the aircraft 2.

Although FIG. 1 has been described above in terms of passive infrared imaging from an aerial vantage point, other forms of invisible and visible radiation might also be detected from a variety of positions. The imaging system might also be "steered" in order to continuously receive radiation from just one ground resolution element 4 as the aircraft 2 moves over that element. Furthermore, fast steering may be used to correct for vibrational distortions in the image, such as "line of sight" errors, which are discussed in more detail below.

Imaging systems with both steering and scanning capabilities are sometimes referred to as "steering/scanning" systems. The imaging system could also be arranged as "forward-looking" so that it receives radiation from sources other than those on the ground. The aircraft 2 might even be fitted with an active source of radiation, such as spotlight or a high intensity laser, that could be used to illuminate specific objects during a survey.

FIG. 2 illustrates a typical electro-optical imaging system for use in conducting the aerial survey illustrated in FIG. 1. In practice, it has been found useful to provide such imaging systems with a small, lightweight mirror assembly 10 which can be rolled from sided to side much more easily than rolling the entire aircraft 2. Radiation from outside the aircraft 2 is reflected off of the mirror assembly 10 through a series of focusing elements 12 to an optical sensor 14. Electrical signals from the optical sensor 14 are then processed by an electronics package 16 before being displayed in a visual format at a monitor 18.

Vibrations in the aircraft which are transmitted to the mirror assembly 10 and focussing elements 12 may cause "line of sight" errors in the resulting image. These vibrational movements will distort the image which is received by optical sensor 14 in much the same way that a photographer's shaky hand on a camera lens will distort the resulting image in a photograph. In either case, the image distortion may be prevented by either stabilizing the imaging system or "steering" it very quickly in order to compensate for the vibrations. However, since it is generally much more difficult to eliminate vibrations in a moving aircraft than it is to steady a stationary imaging system (such as a camera) on the ground, fast steering mirrors are usually associated only with moving imaging systems such as those used for aerial surveys.

As illustrated in FIG. 2, the mirror assembly 10 may be positioned to rotate about two perpendicular axes. These rotations are sometimes referred to as "pitch" and "yaw." In order to accurately resolve the reflected images on sensor 14, however, the mirror assembly 10 must not be allowed to move or rotate along the other axes, and it must be held very still once it is in position. Consequently, the support structure for the mirror must be rigid enough to minimize any deflections due to vibration (which might cause line of sight errors) along the stationary axes and yet still flexible enough along two rotational axes to allow the mirror to be quickly and accurately positioned. Furthermore, the final position of the mirror must be continuously compensated for the effects of vibration.

The effects of vibrations on a structure are often described in terms of natural frequencies, or natural modes of vibration. When any structure is subjected to an impulse, i.e., a sudden force for a very short duration, that structure will vibrate at one or more natural frequencies, or modes, defined by physical characteristics of the structure such as its shape, mass, and flexibility. For example, when two fine crystal glasses are clinked together during a toast (i.e., when they are subjected to an impulse), the edges of the glasses will move back and forth thousands of times, or cycles, per second. Depending on the quality of the crystal, the two glasses will vibrate with at least one frequency in the audible range of 20,000 to 20,000,000 Hertz (cycles per second) to produce an aesthetically pleasing and audible "ring." At the same time, the glasses may also ring at other frequencies which are outside of this acoustic bandwidth defining the normal range of hearing for the human ear. The loudness of the ring will be determined by the amplitude of the vibrations, i.e., the distance that the edges of the glass are deflected during each complete cycle of vibration. Obviously, if the glasses are clinked together too loudly, then they may deflect so far that they actually crack or shatter.

Structural vibrations may also be caused by mechanical energy in other forms besides impulses. For example, each of the glass structures described above would also vibrate if they were subjected to an oscillating source of energy, such as a loudspeaker. When placed in front of the loudspeaker, the glass will tend to vibrate at the same frequency, or frequencies, that are being emitted by the loudspeaker. The glass will vibrate the most (i.e., it will deflect the farthest) when it is driven by the loudspeaker at a natural frequency of the glass structure. In fact, when driven with sufficient energy at a natural frequency, the glass may deflect so far during each cycle that it breaks. Several operatic divas have been known to exhibit the power of their voices by dramatically shattering fine crystal glassware in this manner.

In a similar manner, during normal operation, the mirror assembly 10 will be excited by vibrations, including both impulses and oscillations, from the body of the aircraft 2. The vibrations in the aircraft 2 may stem from a variety of sources such as the rotation of the engines, air flow over the wings, and movement of the payload. As long as these vibrations do not occur at a frequency near the natural frequency of the mirror support structure, then the reflective surface of the mirror in mirror assembly 10 will remain relatively steady. Even small vibrations near the natural frequency of the mirror support structure, however, may cause the support structure to deflect so wildly as to distort the image reflected to sensor 14.

The mirror support structure must thus be rigidly fixed to the body of the aircraft 2 and yet also flexible enough to rotate around two perpendicular axes in order to provide an adequate field of view for the imaging system. Rotational flexibility is particularly important during scanning operations where the mirror must be continuously rotated back and forth. For steering operations, on the other hand, and especially for fast steering operation to correct for line of sight errors, the mirror must be rotated into position and then held steady. It is therefore important during steering for the structure to be stiff enough to remain unaffected by vibrations and impulses once the mirror assembly is moved into position. During both steering and scanning operations, the position of the mirror must also be continuously compensated, or controlled, for the effects of vibration.

DESCRIPTION OF THE RELATED ART

Conventional mirror assemblies have failed to provide adequate rigidity to minimize deflections caused by vibrations while still providing sufficient flexibility along certain axes to allow the mirror to be adequately positioned. More particularly, conventional mirror assemblies have proven to be inadequate for use in both scanning operations, which generally require flexibility, and steering operations, which generally require rigidity. In addition, conventional control systems have proven to be inadequate for continuously compensating such conventional mirror assemblies for the effects of vibrations.

For example, U.S. Pat. No. 4,810,079 discloses a positionally adjustable mirror arrangement including universal joints (14, 15) near the center which provide the necessary degrees of rotational freedom. After a course adjustment, actuators (51) are energized to move the mirror (47) relative to the holding member (24) within a limited range of about one milliradian. Such universal joints are typically difficult to manufacture with tolerances that are tight enough to sufficiently minimize vibrational deflections. In addition, like the universal joints which are found on automobiles, the universal joints on mirror support assemblies tend to vibrate more and more as they become worn during normal operation. Consequently, the universal joints (14, 15) which are used in such adjustable mirror arrangements must also be frequently rebuilt or replaced. Moreover, this arrangement is simply unacceptable for scanning and fast steering designs.

U.S. Pat. No. 4,941,740 discloses a mirror mount where the universal joints may be replaced with a stiff rod (16) having a transversely flexible neck (18). The rod (16) provides stiffness in the axial direction while a thin flexible diaphragm (26) secures the mirror (20) to the support body (10). The diaphragm, however, is extremely stiff in the torsional mode and cannot be adequately position the mirror during both steering and scanning. In particular, this design provides only an 11 milliradian stroke (0.63 degrees) which is insufficient mirror travel for large field of view scanning.

Ball Aerospace has developed another mirror support which is illustrated in FIG. 3 of the present specification. The device uses four flexures arranged along each quadrant of the back of a mirror which is depicted in the figure as a dashed oval line. This design requires two H-shaped sections (only one is shown) in order to provide adequate support for the vertical portions of the flexures near the center of the mirror. The flexures are secured to the mirror at their outer periphery and secured to the base near the center of the mirror. The resulting moment arms created in the flexures cause them to be subjected to excessive bending stresses and deflections during even small vibrations. There are numerous other problems with the Ball Aerospace design including control bandwidth, mass unbalance, frequency cross coupling, high stress levels, and high cost.

SUMMARY OF THE DISCLOSURE

The present disclosure generally relates to a support for a fast steering/scanning mirror including a base, a horizontal flexure secured to the base at two ends and also secured to the mirror between two ends of the horizontal flexure, and a vertical flexure, extending from said base, for pivotally supporting the mirror over the base. The support may have a first natural mode with respect to rotation around each of two perpendicular axes that is less than or near 30 Hertz, a second natural mode with respect to rotation around each of said two perpendicular axes that is near or at least 2,000 Hertz, a natural mode with respect to rotation around a third axis which is perpendicular to said two axes that is at least 2,000 Hertz, and a first natural mode with respect to translation along each axis which is at least 2,000 Hertz.

The vertical flexure may be adhesively bonded to the mirror at its back surface. The vertical flexure may include at least two orthogonally arranged plates which intersect on the same axis. At least one of the plates may have a profile which is narrower at a middle portion than at an end portion of the plate. The vertical flexure may include a bottom member for stiffening the vertical flexure where said vertical flexure is secured to said base. The bottom means may include a U-shaped bracket arranged on the vertical flexure. The vertical flexure may further include a middle member for stiffening the vertical flexure where the orthogonally arranged plates intersect. The middle stiffening member may include at least one L-shaped member arranged in a corner formed where the orthogonally arranged plates intersect.

The horizontal flexure may include means for increasing rigidity of the horizontal flexure as the horizontal flexure is rotated. The rigidity increasing means may include a plate with a mustache-shaped edge having a straight portion near a middle of the horizontal flexure which is joined at each end by slanted portions which are joined at each end by curved portions. The rigidity increasing means may also include at least one folded edge on the flat plate which is opposite from said mustache-shaped edge. The horizontal flexure may further include a middle bracket for securing the horizontal flexure to the mirror and at least one end bracket for securing the horizontal flexure to the base.

BRIEF DESCRIPTION OF THE DRAWINGS

The invention will now be further described with reference to the following figures in which like elements have been provided with the same reference numerals.

DESCRIPTION OF THE PREFERRED EMBODIMENTS

Figure 1:
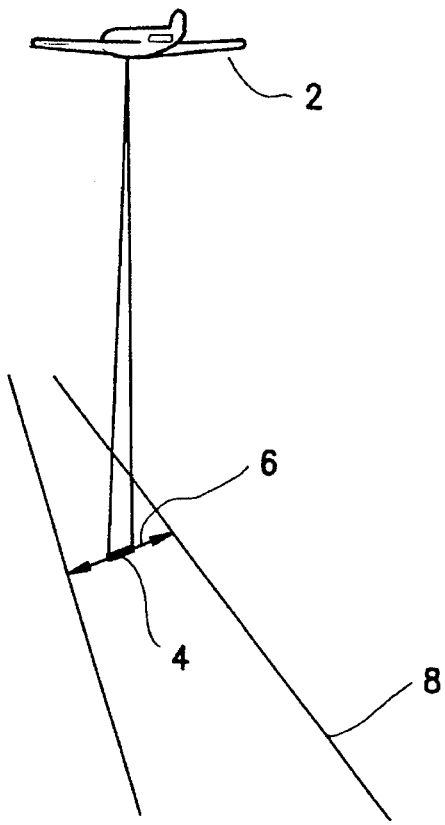
FIG. 1 illustrates a typical aerial heat survey.
Figure 2:
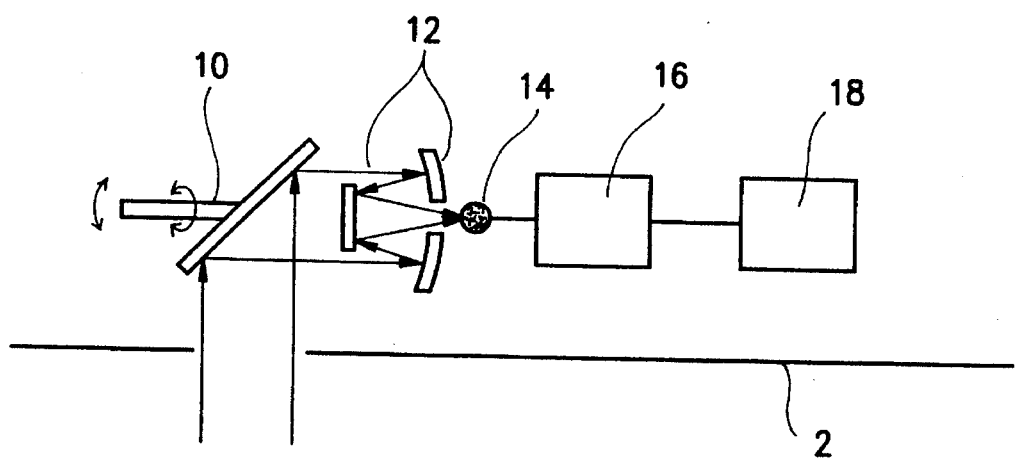
FIG. 2 illustrates a typical electro-optical imaging system for use in conducting the aerial heat survey of FIG. 1.
Figure 3:
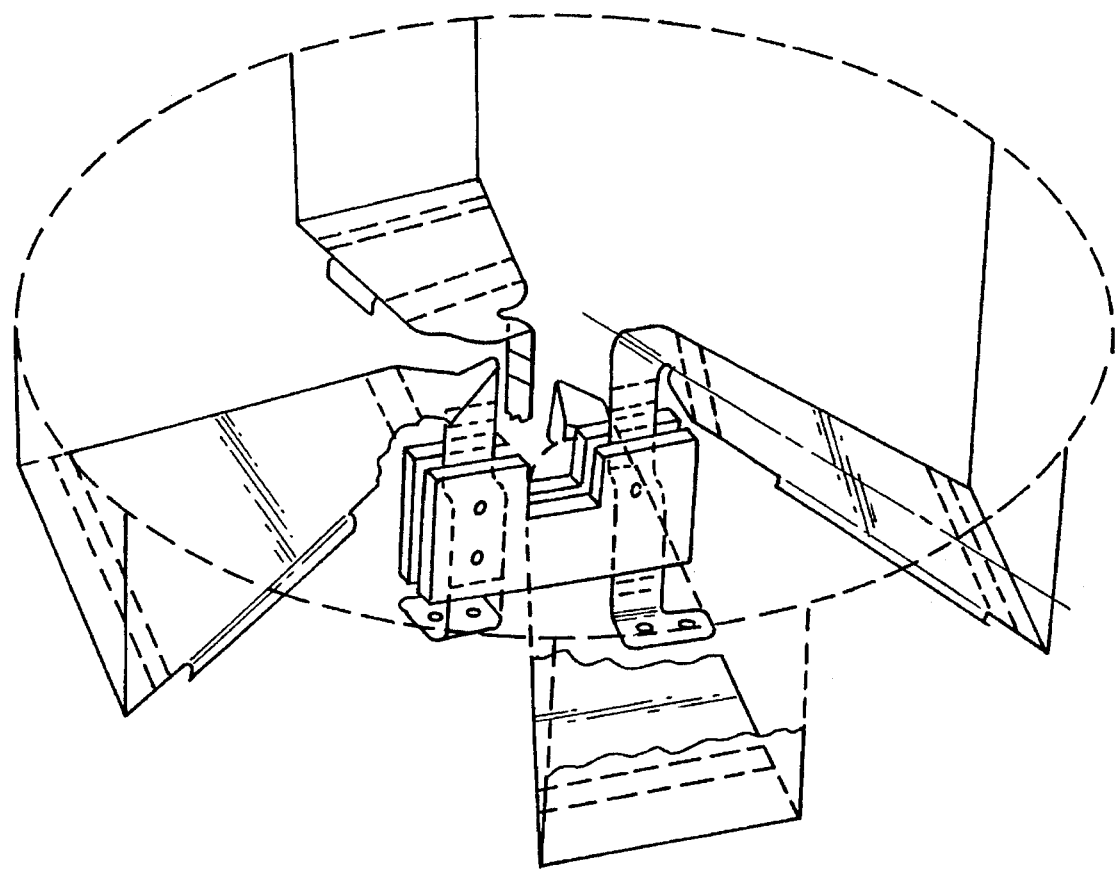
FIG. 3 illustrates a conventional mirror support which is available from Ball Aerospace.

Conventional mirror assemblies have been unable to perform satisfactorily in both scanning operations (which generally require structural flexibility) and steering operations (which generally require structural rigidity). The present inventor has recognized that prior attempts to solve these problems have failed to consider an adequate number of design factors. More specifically, prior attempts to solve these problems have failed fully to consider the effects of mass distribution and frictional damping which, along with the spring constant of the structural material, all play an important role in determining the dynamic characteristics of the support structure. Other factors were also considered such as the thermal and vibrational environments of high speed tactical aircraft, fatigue life of structural materials, travel distance of the mirror, cross coupling of the natural frequencies of the structure, bandwidth of the structure, accuracy, repeatability, scan linearity, power consumption, size, weight, frictionless operability, and simplicity of design.

The present inventor has discovered that many of these factors may be addressed by considering the flexibility of the structure in terms of natural modes of vibration. Furthermore, the present inventor has formulated a set of specifications which may not be attained with conventional mirror supports. These specifications generally provide an adequate solution to many of the problems of conventional mirror assemblies. Using the frame of reference shown in FIG. 4, the present inventor has provided that a first natural mode with respect to translation in the X, Y, and Z directions should be at least 2,000 Hertz. The first natural mode with respect to rotation in the Z direction should also at least 2,000 Hertz. The range of travel may be approximately 4.25 degrees.

With respect to rotation around the X and Y axes (sometimes referred to as the scan and ortho-scan axes), the present inventor has discovered that sufficient rigidity with respect to vibrations and sufficient flexibility for scanning may be obtained by designing a mirror suspension system with a wide bandwidth for the tactical aircraft operation. In particular, the present inventor has discovered that a mirror assembly with a very low first natural mode and a very high second natural mode with respect to rotation along the X and Y axes is appropriate for many applications. Specifically, the mirror assembly may have a first mode with respect to rotation around the X and Y axes that is near (or not more than) 30 Hertz (or not more than 25 Hertz) and a second mode with respect to rotation around the X and the Y axes which is near (or at least) 2,000 Hertz. Any other axis, including the Z axis may have a first natural mode with respect to vibration which is at least 2000 Hertz. The first two modes may be pure and not cross couple.

Alternatively, the Y axis may be arranged with a first natural mode with respect to vibration that is approximately 105 Hertz and a second natural mode that is at least 2000 Hertz in order to allow the mirror to be more easily aligned along the ortho-scan axis.

In addition to formulating the physical principles that lead to an adequate solution to the problems associated with conventional supports, the present inventor has also conceived an apparatus which may meet or exceed these specifications.

Figure 4:
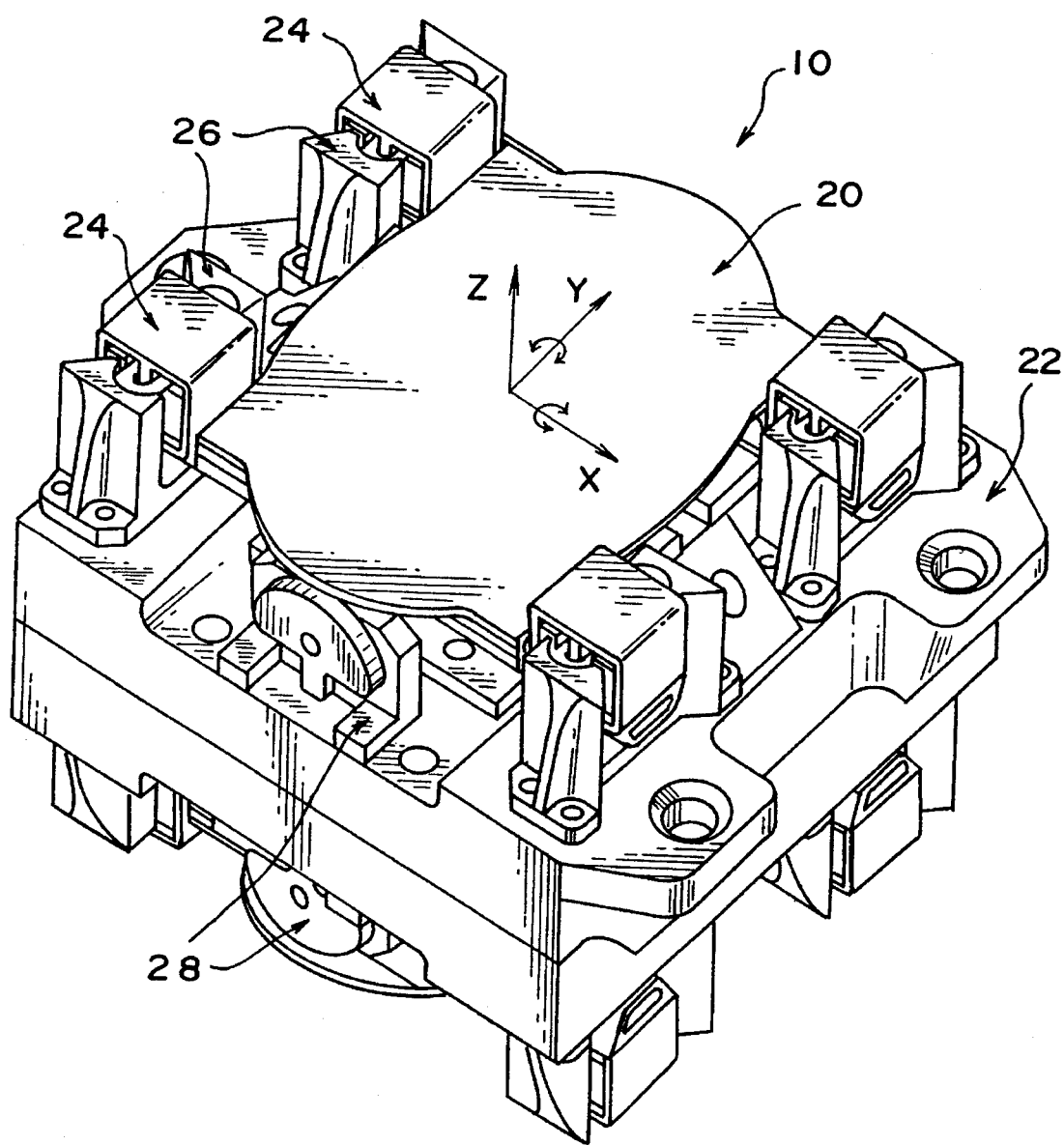
FIG. 4 is an isometric view of a mirror assembly with a reactive mass.
Figure 5:
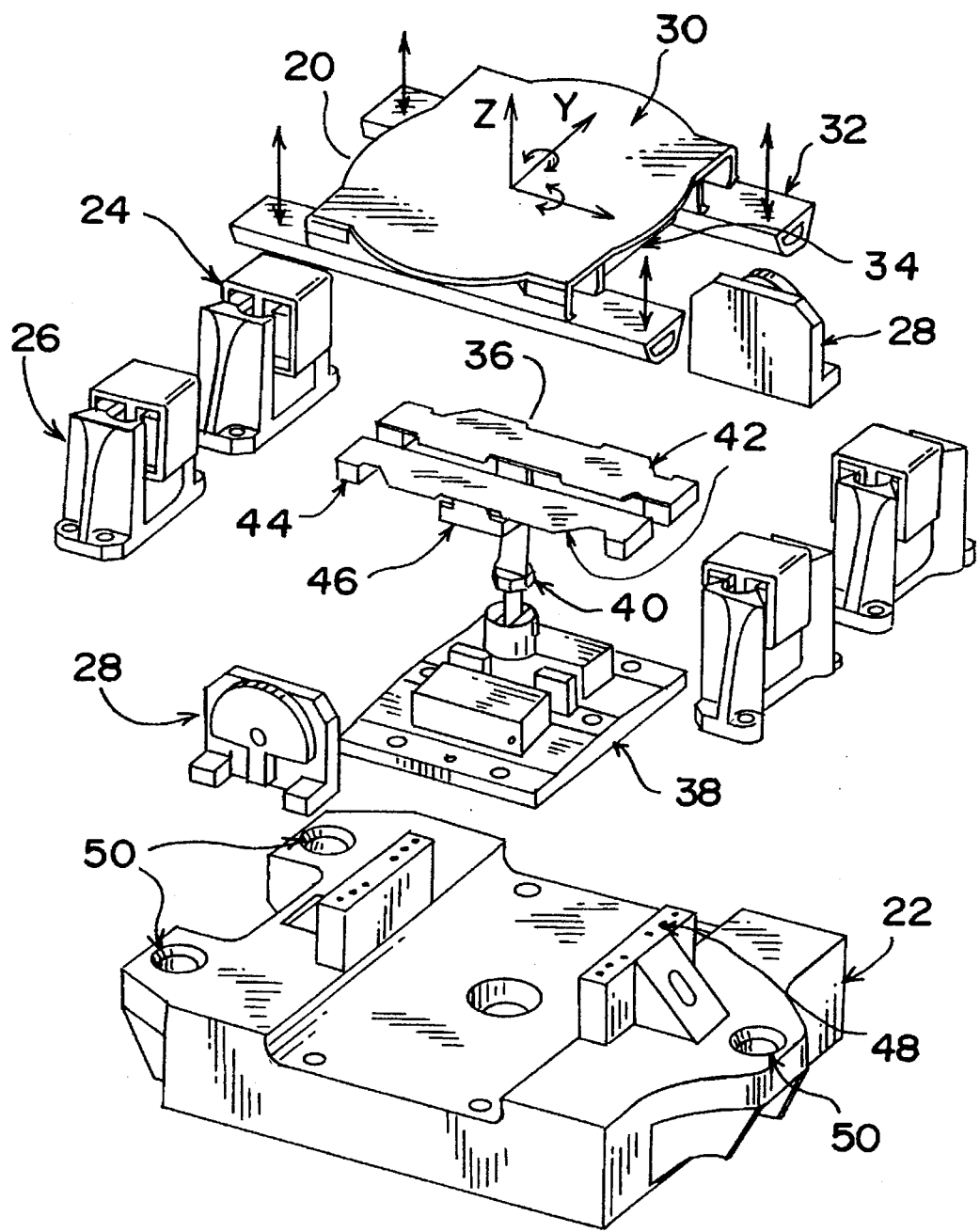
FIG. 5 is an exploded isometric view of the mirror assembly in FIG. 4 without a reactive mass.

FIG. 4 and FIG. 5 illustrate a mirror assembly 10 which may be used with the present invention. As illustrated in FIG. 4, mirror 20 may be arranged on a base 22 so as to rotate around an X axis and a Y axis which are perpendicular to each other as shown in the figures. The mirror 20 may also be substantially fixed against rotation around a Z axis, which is perpendicular to the plane formed by the X and Y axes, and substantially fixed against translation along all three axes. Base 22 may be secured to aircraft 2 through base mounting holes 50. Alternatively, base 22 may be mounted on any platform using any other conventional means such as bolting, screwing, welding, soldering, or laser welding.

The mirror 20 may be positioned by a coordinated action of actuators 24. The actuators 24 may be linear actuators or any other means for moving mirror 20 such as the piezo-electric elements, solenoids, or servomotors. Although four actuators are shown in FIG. 4, any number of actuators could also be used. The coils for actuators 24 may be secured to base 22 by actuator mounting supports 26 and an actuator magnet may be secured to actuator mounting legs 32. This arrangement of coils and magnets provides a substantially frictionless operation.

A mirror stop assembly 28 may also be secured to base 22. The mirror stop assembly serves to define the maximum limits of excursion of the mirror 20 and to provide a lock during transportation.

As illustrated in FIG. 4, a similar combination of mirror 20, actuators 24, and mirror stop assembly 28 may also be secured to the bottom side of base 22 in order to act as a reactive mass which balances against the movements of mirror 20. Reactive masses are particularly important for weightless orbital applications where any unbalanced movement on one side of mirror assembly 10 could adversely affect the orbital trajectory of the satellite or spacecraft housing the mirror support assembly 10. Alternatively, the mirror assembly 10 may be used without a reactive mass, for example, in applications under normal gravitational conditions.

FIG. 5 is an exploded isometric view of the mirror assembly 10 shown in FIG. 4 without a reactive mass. The mirror 20 includes a reflective surface 30 having four actuator mounting legs 32. However, another number of actuators and actuator mounting legs may be used, depending on the application. The actuator mounting legs 32 may be secured to the actuators 24 in order to move the actuator mounting legs 32 in the vertical direction as shown in FIG. 5. A coordinated vertical movement of the actuator mounting legs 32 will rotate the reflective surface 30 of mirror 20 about the X and Y axes. The mirror 20 may also include two rectangular holes 34 which extend through the mirror 20 from side to side behind the reflective surface 30.

The mirror 20 may be secured to base 22 through the actuators 24 and a support assembly 36. The support assembly 36 typically includes a baseplate 38, a vertical flexure 40, and at least one, but preferably two, horizontal flexures 42. The horizontal flexures 42 may be arranged with end brackets 44 for securing the ends of the horizontal flexures 42 to the base 22. The horizontal flexures 42 may also include middle brackets 46 for securing the horizontal flexures to the mirror 20.

The horizontal flexures 42 are preferably arranged to pass through the two rectangular through holes 34 so that the end brackets 44 may be secured to the base 22 on the lugs 48 at each end of the horizontal flexures 42. The middle brackets 46 are then secured to the mirror 20. The horizontal flexures 42 and vertical flexure 40 help provide the support assembly 36 with the necessary translational rigidity along three axes and the necessary rotational flexibility along the other axes.

Figure 6:
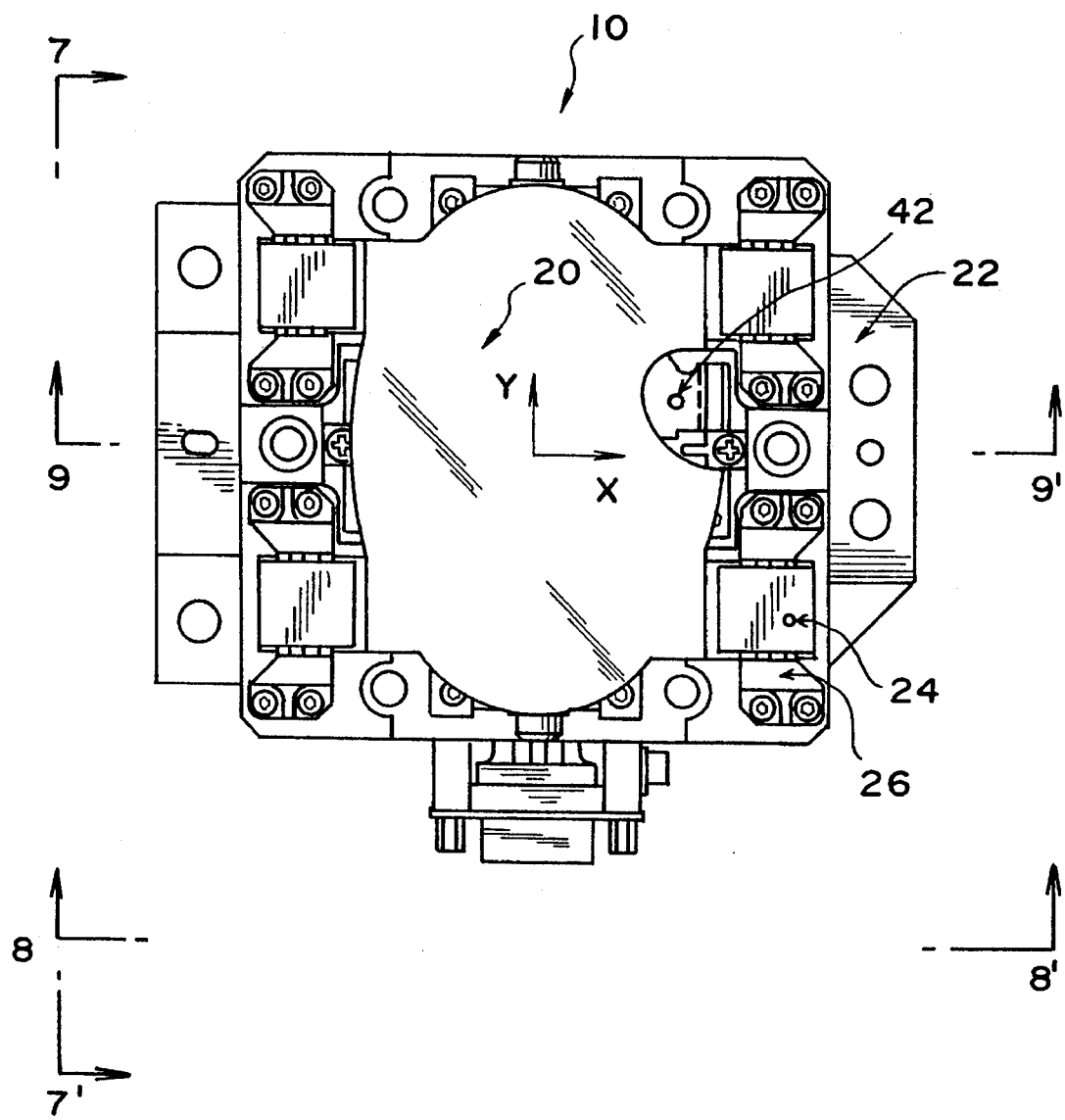
FIG. 6 is a top view of the mirror assembly of FIG. 5.

FIG. 6 is a top view of the mirror assembly 10 which includes a cutaway portion through the mirror 20. The cutaway portion exposes one of the horizontal flexures 42 which is secured to the lug 48 (not shown in FIG. 6) on the base 22.

Figure 7:
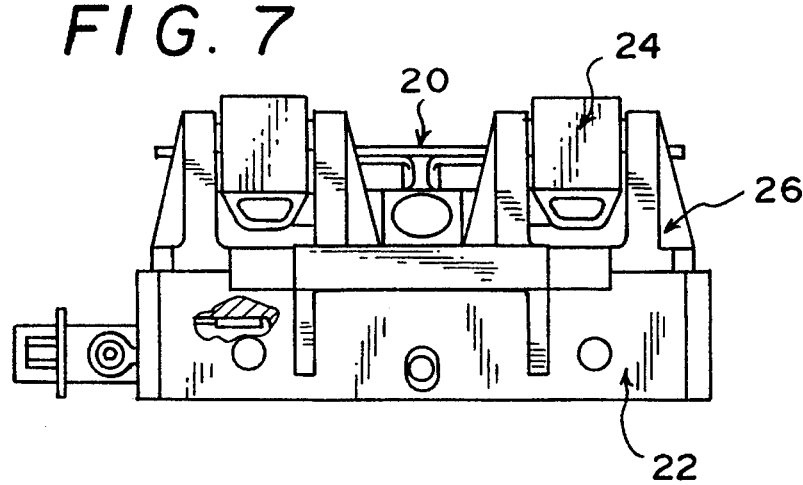
FIGS. 7 and 8 are side views of the mirror assembly in FIG. 6 which are taken along lines 7–7' and 8–8', respectively.
Figure 8:
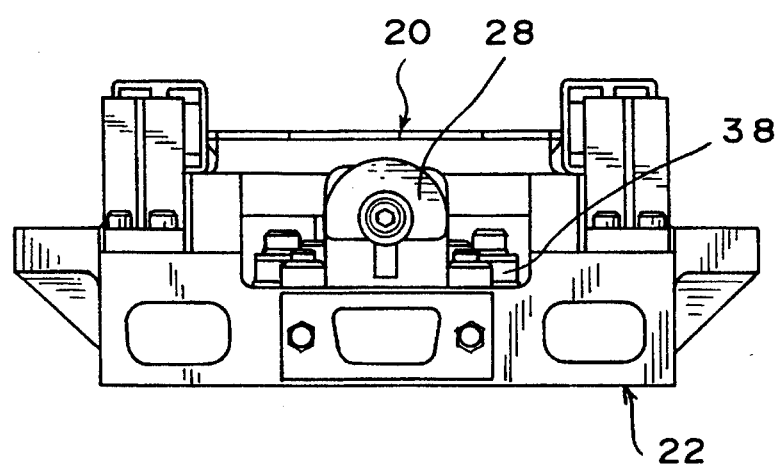

FIGS. 7 and 8 are side views of the mirror assembly 10 shown in FIG. 6.

Figure 9:
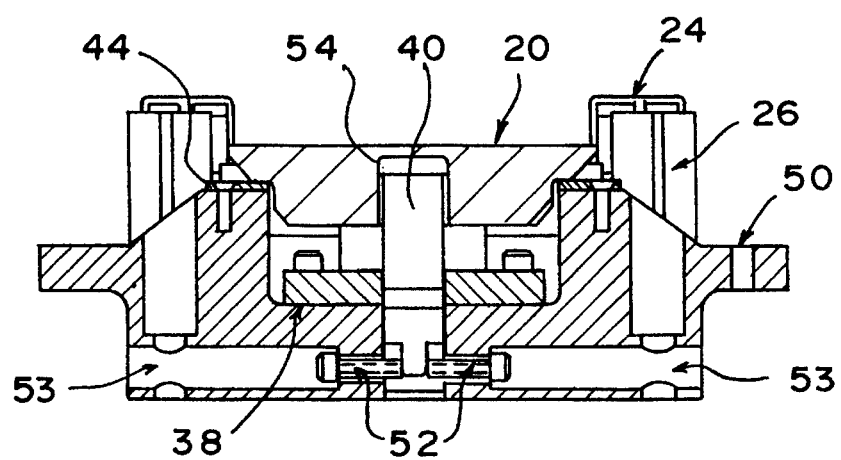
FIG. 9 is a sectional view of the mirror assembly which is taken along section line 9–9' in FIG. 6.

FIG. 9 is a sectional view of the mirror assembly 10 which is taken along section line 9–9' in FIG. 6. As illustrated in FIG. 9, the vertical flexure 40 may be secured to the base 22 at one end by bolts 52 so that the vertical flexure 40 extends through the baseplate 38 and into the mirror 20. Bolts 52 may be accessed through access holes 53 in the base 22. An end portion of the vertical flexure 40 may be fastened to the back side of mirror 20 with an adhesive 54, such as epoxy. The vertical flexure 40 is said to be pivotally secured to mirror 40.

The horizontal flexures 42 may include end brackets 44 at each end for securing the horizontal flexures 42 to lugs 48. The horizontal flexure 42 may also be secured to the mirror 20 using the middle brackets 46 which are arranged on the horizontal flexures 42 between the end brackets 44. The brackets 44, 46 may be secured to base 22 and mirror 44, respectively, through any conventional means such as bolting, screwing, soldering, welding, or laser welding. The end brackets 44 and the middle brackets 46 may also be secured to horizontal flexures 42 by any suitable means such as screwing, bolting, soldering, welding, or laser welding. Alternatively, the horizontal flexures 42 may be secured to the mirror 20 and the lugs 48 directly without the middle brackets 46 or the end brackets 44, or by integrating the brackets into the horizontal flexure.

Figure 10:
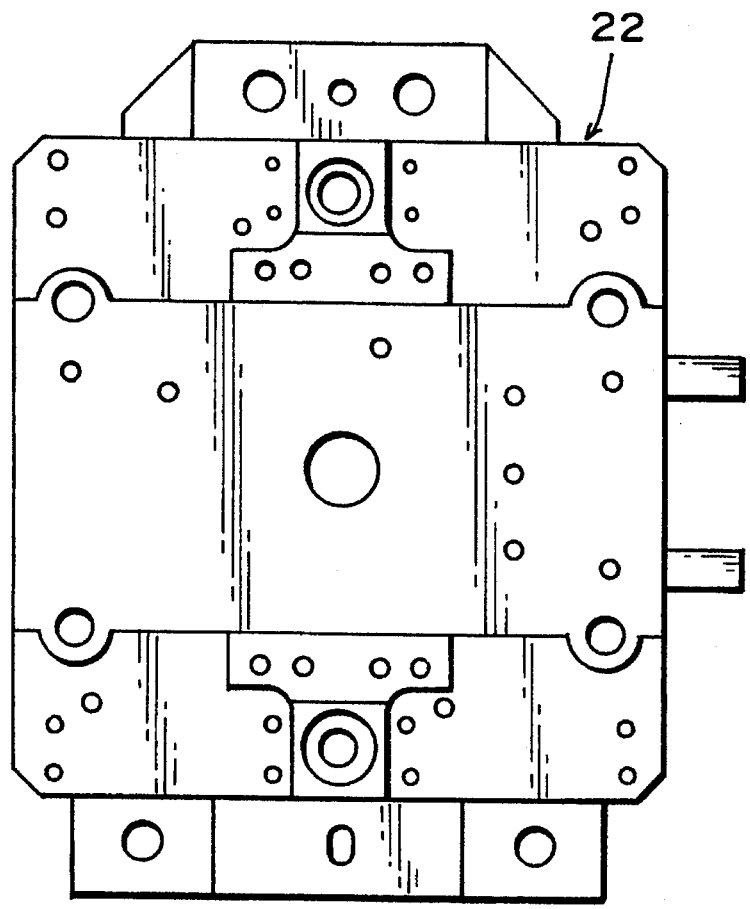
FIG. 10 is a top view of a base for use with the mirror assembly in FIG. 5.
Figure 11:
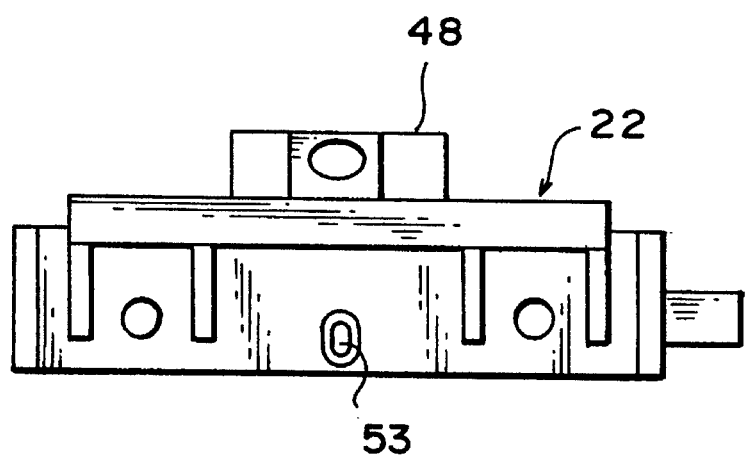
FIGS. 11, 12, and 13 are side views of the base in FIG. 10.
Figure 12:
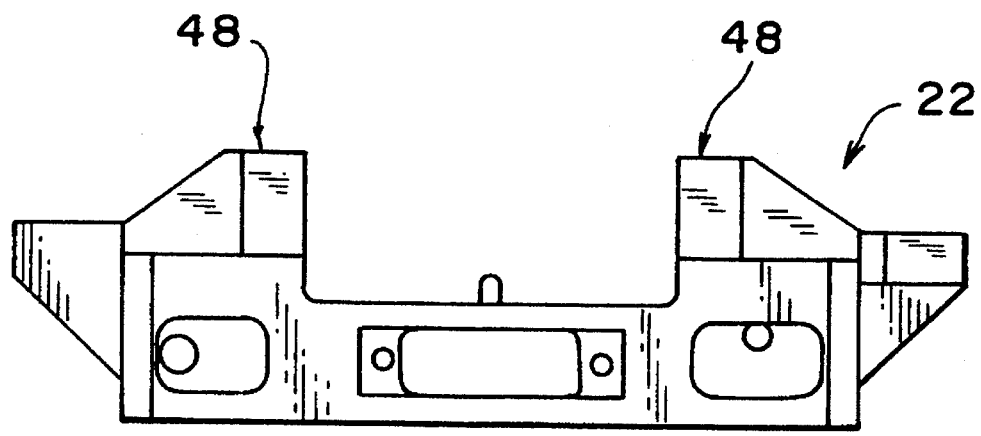
Figure 13:
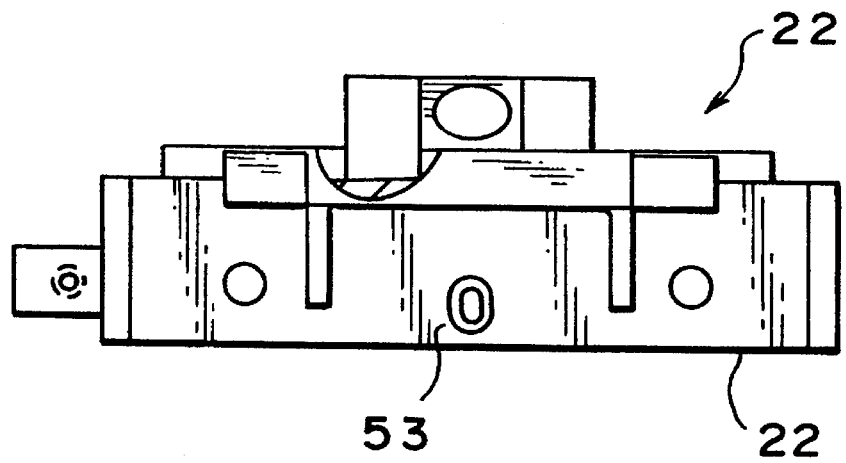

FIG. 10 is a top view of the base 22 for use with the mirror assembly 10 shown in FIG. 5. FIGS. 11, 12, and 13 are side views of the base 22 shown in FIG. 10. The base 22 may be formed from a stiff and lightweight material such as 40% SIC/6061-T6 Aluminum metal matrix which is available from Advanced Composite Materials Corporation of Greer, S.C. The rough machined base 22 may be stress relieved in accordance with MIL-H-6088 by placing it in an air circulating oven at room temperature and then heating to 350° F. for 4.00±0.25 hours followed by a slow oven cool (turn off heating element but do not open oven doors) to 100° F. before removing the base from the oven to cool at room temperature. The base 22 may also be thermocycled by cooling to −50° F.±5° and holding for 30±5 minutes, warming to 77° F.±10° and holding for at least 15 minutes, heating to 175°±5° in air circulating oven and holding for 30±5 minutes, and then cooling to 77° F.±10° and holding for at least 15 minutes. The thermocycling should be repeated at least three times and the rate of temperature change should not exceed 3° F. per minute. Other materials and treatments may also be used to form the base 22.

Figure 14:
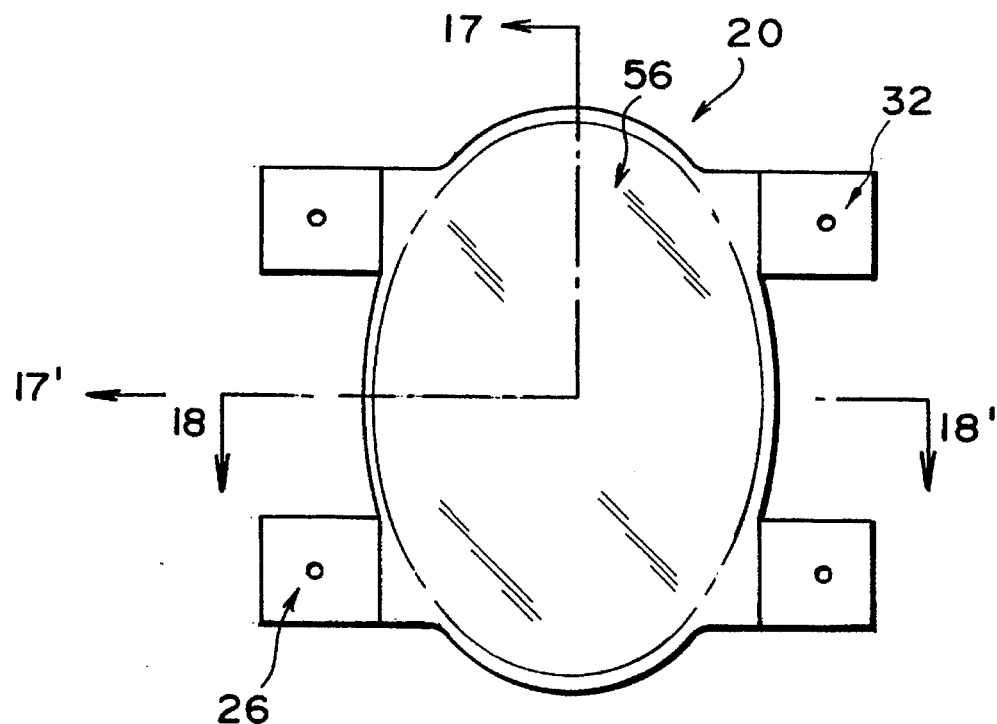
FIG. 14 is a top view of a mirror for use with the mirror assembly of FIG. 5.

FIG. 14 is a top view of the mirror 20 for use with the mirror assembly 10 shown in FIG. 5. The mirror may be formed from I-220-B, Type II, hot pressed beryllium block, which is available from the Brush Wellman Corporation of Cleveland, Ohio. The mirror 20 is shown with an oval reflective surface 56; however, the reflective surface 56 and the mirror 20 may have other shapes.

Figure 15:
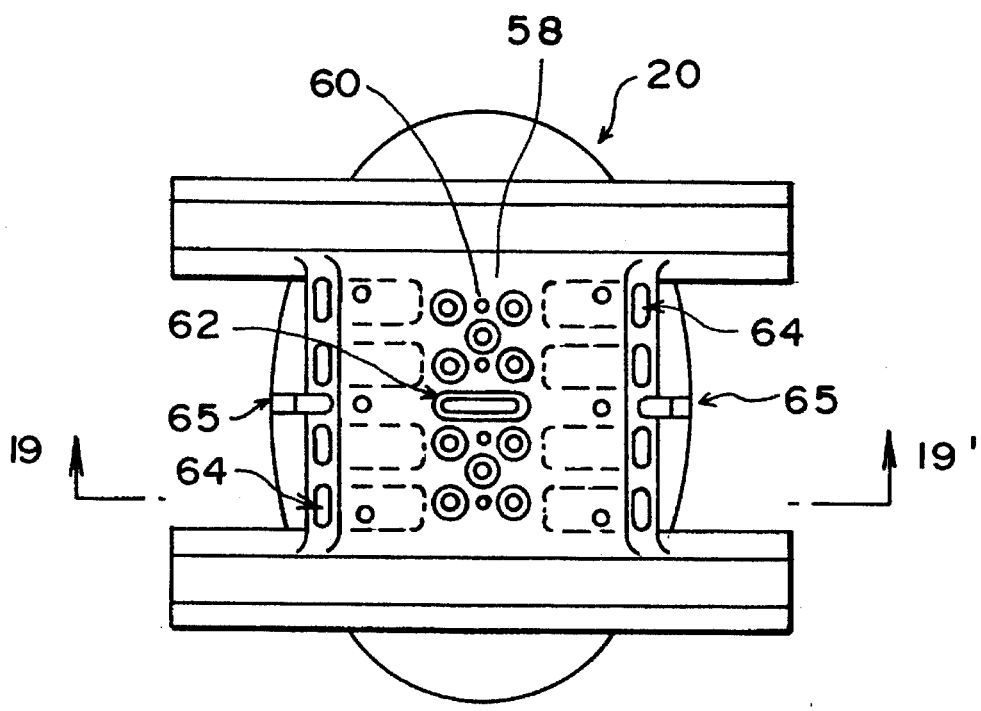
FIG. 15 is a bottom view of the mirror in FIG. 14.

FIG. 15 is a bottom view of the mirror 20 shown in FIG. 14. The backside of mirror 20 may include two groups of holes 58 which are arranged in 5-spot patterns for securing the middle brackets 46 on horizontal flexures 42 onto the backside of the mirror 20. Such 5-spot patterns have been found useful for accurately aligning and tightly securing the middle brackets 46 on horizontal flexures 42 to the mirror 20, such as by bolting or screwing. The illustrated 5-spot patterns include five countersunk holes which may be used with flush mounted bolts. However, other conventional means for securing mirror 20 to middle brackets 46 may also be used as noted above.

The mirror 20 may be at least partially supported by a horizontal flexure which fits inside mirror 20 through holes 34. Two horizontal flexures 42 are shown in FIG. 5. Each of the horizontal flexures 42 may be inserted through holes 34 in the mirror 20 by the middle bracket 46 at one of the 5-spot patterns 58. Alternatively, the horizontal flexures 42 may be secured directly to mirror 20 without using a middle bracket 46 or by using other conventional means such as screwing, bolting, soldering, welding, or laser welding. The middle brackets 46 have been found useful for providing additional stiffness near the middle of the horizontal flexures 42. Each 5-spot pattern 58 in mirror 20 may also include two smaller alignment holes 60 which have been found useful for aligning and securing the middle brackets 46 to the surface of the horizontal flexures 42 by, for example, laser welding.

The mirror 20 may include a slot 62 which is arranged near the center of the mirror 20, between the two 5-spot patterns 58, for receiving a top portion of the vertical flexure 40. The mirror 20 may also include several weight reduction spaces 64 which help reduce the weight of the mirror without decreasing its structural strength and rigidity. A rib 66 may separate the two rectangular holes 34 and also help to stiffen the mirror 20 near its middle.

Figure 16:
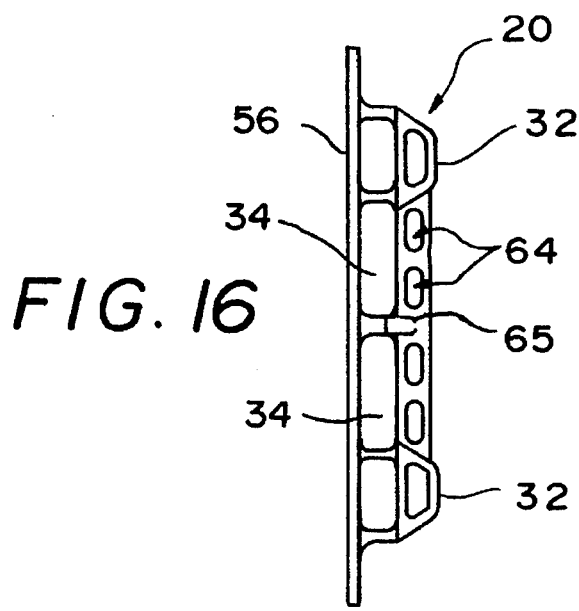
FIG. 16 is a side view of the mirror in FIG. 14.

FIG. 16 is a side view of the mirror 20 shown in FIG. 14. FIG. 16 more clearly illustrates the relative position of the two rectangular holes 34, which are separated by rib 65, for housing a portion of the horizontal flexures 42 inside mirror 20. A horizontal flexure 42 may be arranged in each hole 34 on either side of rib 34.

Figure 17:
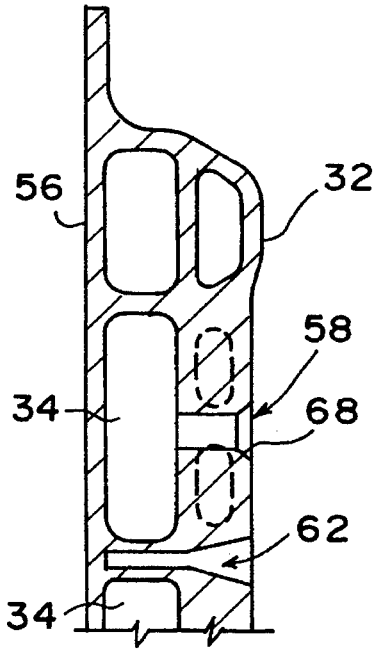
FIGS. 17, 18, and 19 are section views taken along section lines 17–17', 18–18', and 19–19', respectively, in FIGS. 14 and 15.
Figure 18:
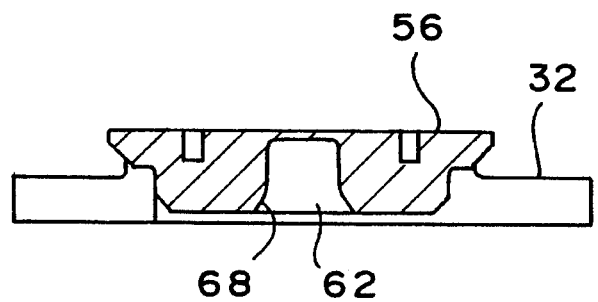
Figure 19:
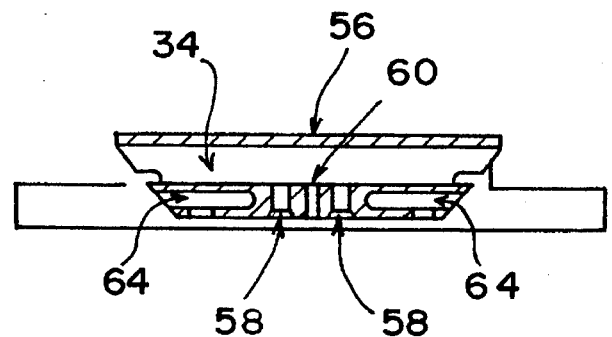

FIGS. 17, 18, and 19 are section views taken along section lines 17–17', 18–18', and 19–19', in FIGS. 14 and 15. FIG. 17 more clearly illustrates a cross-section of slot 62 for receiving a top portion of the vertical flexure 40. Slot 62 may include a tapered section 68 which provides space for the vertical flexure 40 to bend and also facilitates the insertion of the vertical flexure 40 into the back side of mirror 20. FIG. 17 and FIG. 18 illustrate that taper 68 may be angled in two dimensions, along its width and also along its length. FIG. 19 more clearly illustrates one of the rectangular holes 34 and the relative position of two of the holes in a 5-spot pattern which extend into through hole 34 from the back side of mirror 20.

FIGS. 20 through 24 illustrate the horizontal flexure 42 in more detail. The horizontal flexures 42 and the vertical flexure 40 may be formed from 17-7 PH Cres, condition RH950 stainless steel, per AMS 5526. However, the middle brackets 46 and the end brackets 44 do not necessarily need to be heat treated. The surfaces should be cleaned and descaled per ASTM-A360. The horizontal and vertical flexures may also be formed from other materials and treatments.

Figure 20:
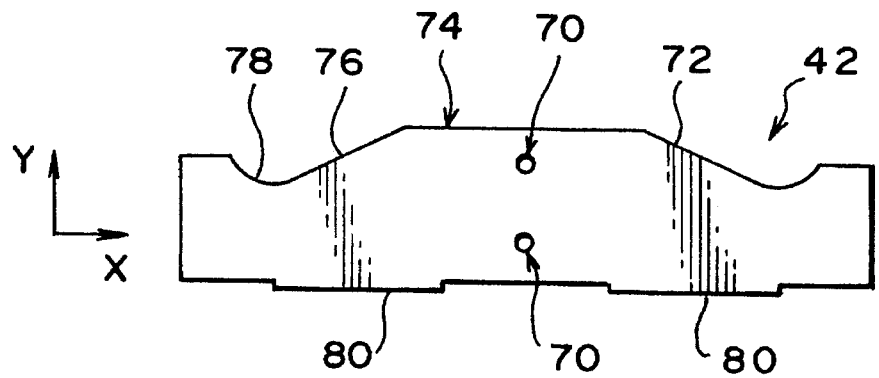
FIG. 20 is a top view of a horizontal flexure which may be used with the mirror assembly of FIG. 5.

FIG. 20 is a top view of one of the horizontal flexures 42 used in FIG. 5. The horizontal flexure 42 may include two alignment holes 70 which may be used to align and secure middle bracket 46 to the bottom surface of horizontal flexure 42, for example, by laser welding or other conventional means. The alignment holes 70 in the horizontal flexure 42 and middle bracket 46 will match up with the alignment holes 60 in the mirror 20 during normal assembly.

The horizontal flexure 42 may include an edge 72 which may be described as "mustache-shaped." The mustache-shaped edge 72 includes a straight portion 74 near the middle of the horizontal flexure 42. Each end of straight portion 74 is connected to a slanted portion 76 followed by a curved portion 78. The edge 72 causes the profile of horizontal flexure 42 to gradually narrow at each end near end brackets 40. Straight portion 74 may be longer than the width of middle bracket 47. The mustache-shaped edge 72 provides necessary stiffness in the horizontal flexure 42 as it is rotated about the X axis.

The edge which is opposite the mustache-shaped edge 72 may include two bent or folded portions 80 which increase the resistance of the horizontal flexure 42 to bending around the Y axis. The mustache-shaped edge 72 and the bent portions 80 cooperate to produce a suitable natural mode when used in conjunction with support assembly 36.

Figure 21:
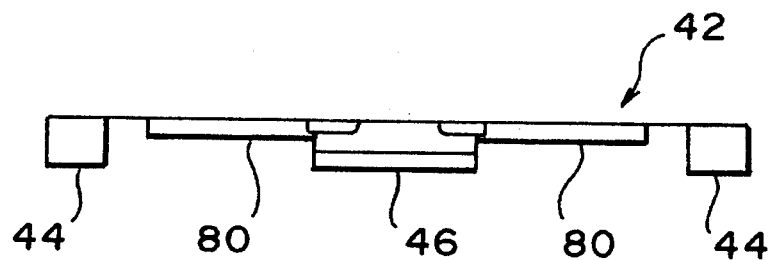
FIG. 21 is a side view of a horizontal flexure which may be used with the mirror assembly of FIG. 20.

FIG. 21 is a side view of the horizontal flexure 42 shown in FIG. 20. FIG. 21 illustrates the relative positions of end brackets 44 and middle bracket 46 on the underside of horizontal flexure 42. The end brackets 44 and the middle bracket 46 may be secured to flexure 42 by any conventional means such as screwing, bolting, soldering, welding, or laser welding.

Figure 22:
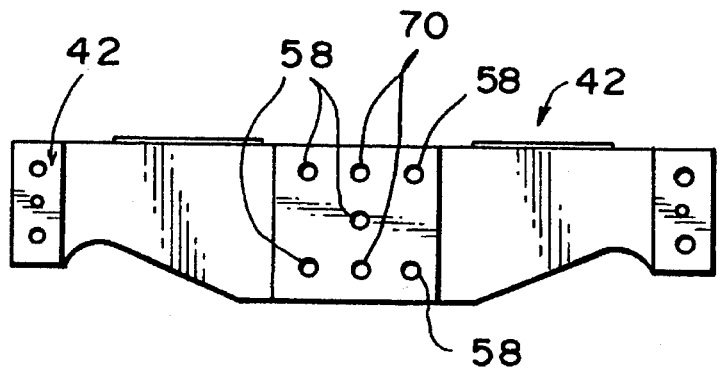
FIG. 22 is a bottom view of a horizontal flexure which may be used with the mirror assembly of FIG. 20.

FIG. 22 is a bottom view of horizontal flexure 42 which more clearly illustrates the relative positions of the five holes in 5-spot pattern 58 and the two alignment holes 70. All holes may be internally threaded.

Figure 24:
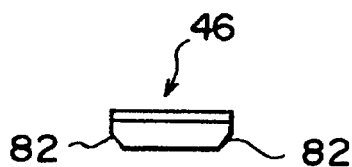
FIGS. 23 and 24 are front side and views, respectively, of a bracket which may be used with the horizontal flexure of FIGS. 20–22.
Figure 23:
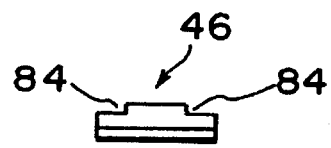

FIGS. 23 and 24 are front and side views, respectively, of the middle bracket 46. The middle bracket 46 may include chamfered edges 82 which serve to increase the strength of middle bracket 46 near the corners. The middle bracket 46 may also include notched portions 84 which provide additional space for the horizontal flexure 42 to deflect during rotation.

Figure 25:
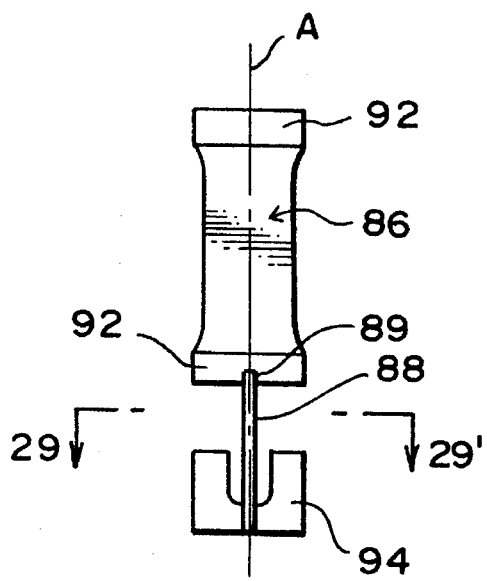
FIGS. 25 and 26 are side views of a vertical flexure which may be used with the mirror assembly of FIG. 5.
Figure 26:
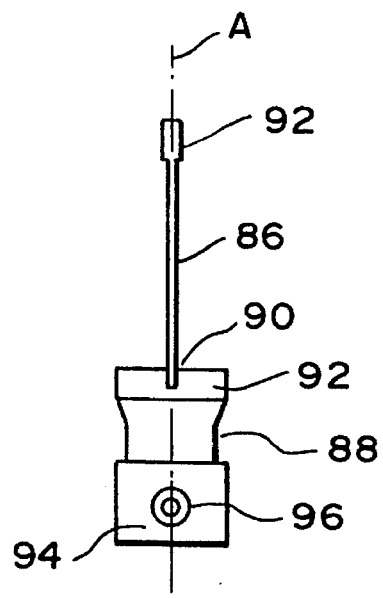
Figure 29:
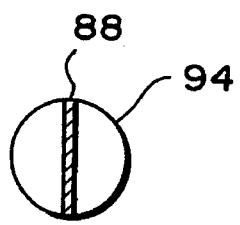
FIG. 29 is a sectional view of the vertical flexure which is taken along section line 29–29' in FIG. 25.

FIGS. 25 and 26 are side views of the vertical flexure 40. The vertical flexure 40 may include two or more orthogonally arranged plates which intersect on the same axis line A. The top plate 86 and the bottom plate 88 may be orthogonally arranged one on top of the other so that the plates intersect along central axis A. The top plate 86 and the bottom plate 88 form a corner 90 where the plates overlap. The top plate 86 may be longer than the bottom plate 88 or vice-versa.

Figure 27:
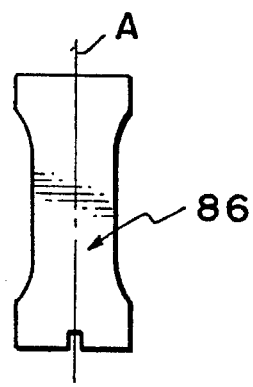
FIG. 27 is a side view of a top plate of the vertical flexure which may be used with the horizontal flexure of FIGS. 25 and 26.
Figure 28:
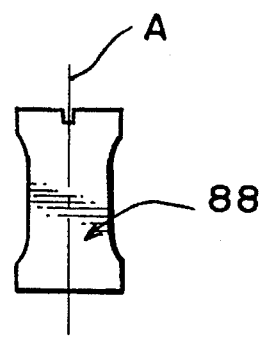
FIG. 28 is a side view of a bottom plate of the vertical flexure which may be used with the horizontal flexure of FIGS. 25 and 26.

FIG. 27 is a side view of top plate 86 while FIG. 28 is a side view of bottom plate 88. Each of the plates 86, 88 may have a generally hour glass-shaped profile. That is to say, the profile of each of the plates 86, 88 may have a wider dimension at each end than a dimension between the ends. Each of the plates 86, 88 may also include top and bottom stiffener plates 92 at each end. The stiffener plates 92 serve to provide structural support to the top and bottom plates 86, 88 near their ends. The vertical flexure 40 may also include a U-shaped bracket 94 arranged on the one end of the bottom plate 88 which is opposite the top plate 86. The U-shaped bracket 94 may have a circular profile which allows it to be secured in a round hole through baseplate 38 and base 22. The U-shaped bracket 94 may also include a hole 96 for securing the U-shaped bracket 94 to the bottom plate 88 with bolts 52.

Figure 30:
FIG. 30 is a top view of a stiffener which may be used with the horizontal flexure of FIGS. 25 and 26.

FIG. 30 is a top view of an L-shaped stiffener 98 which may be arranged in corners 90 where top plate 86 and bottom plate 88 intersect and/or overlap. The L-shaped stiffeners 98 combine with the U-shaped bracket 94, bottom plate 88, and top plate 86 help to create a structure having an appropriate vibrational mode.

Figure 31:
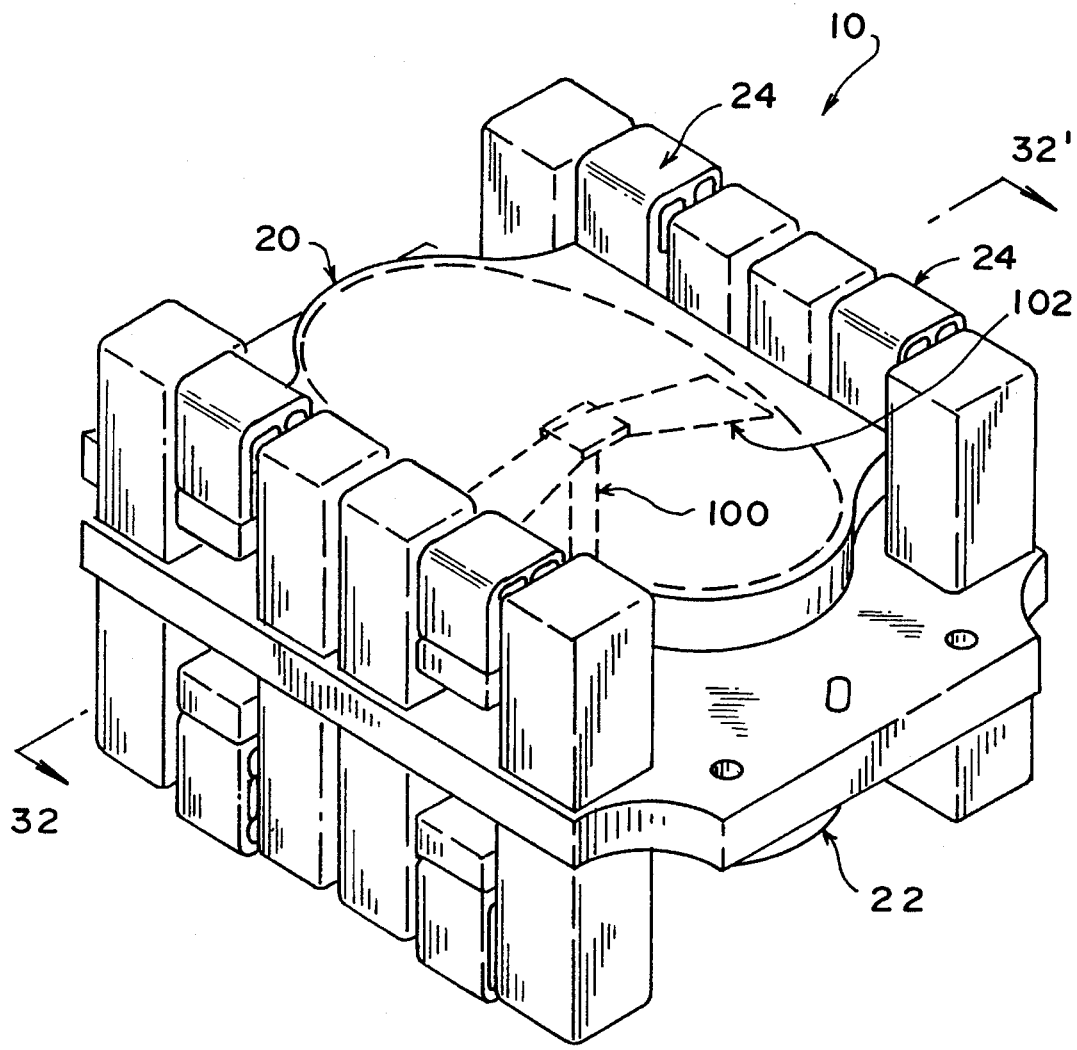
FIG. 31 is an isometric view of another mirror assembly.

FIG. 31 is an isometric view of another embodiment of a mirror assembly 10. The mirror assembly 10 illustrated in FIG. 31 includes a vertical flexure 100 and two side or horizontal flexures 102.

Figure 32:
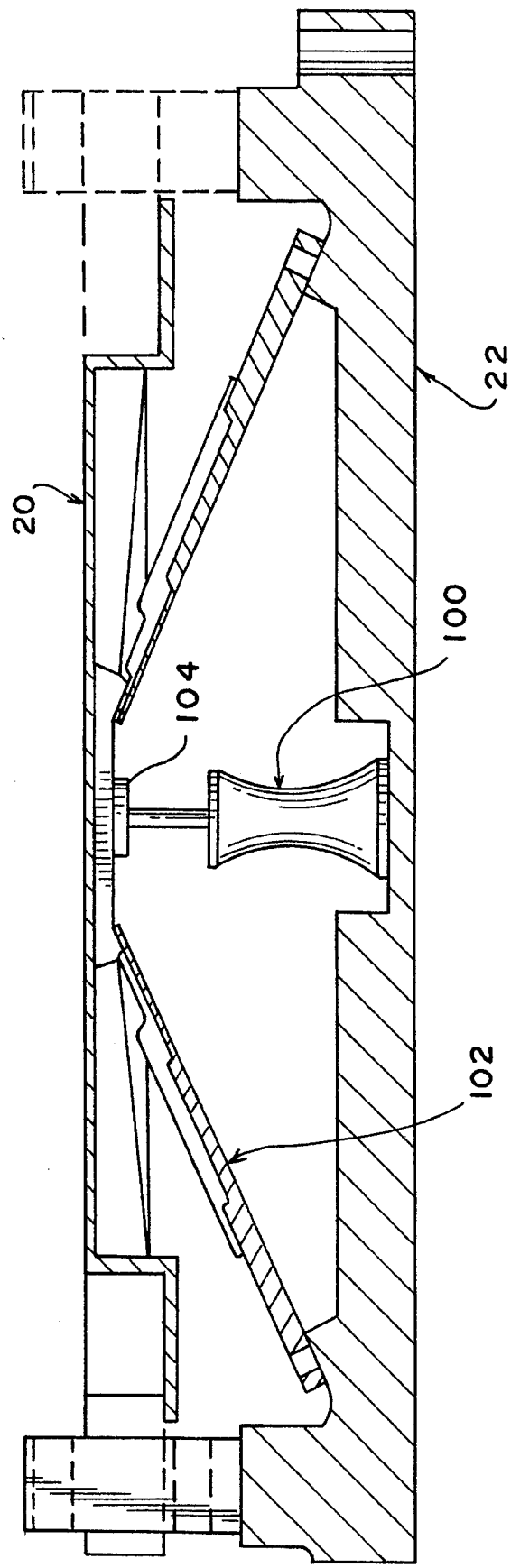
FIG. 32 is a sectional view of the mirror assembly of FIG. 31 taken along section line 32–32' in FIG. 31.

FIG. 32 is a sectional view of the mirror assembly 10 of FIG. 31 taken along section line 32–32' in FIG. 31. The mirror assembly includes a base 22 and two horizontal flexures 102 which are secured to the base 22 at one end and the mirror 20 at the other end. The mirror assembly 10 in FIG. 32 also includes a vertical flexure 100 which may include a bracket 104 for securing the horizontal flexure 102 to mirror 20.

Figure 33:
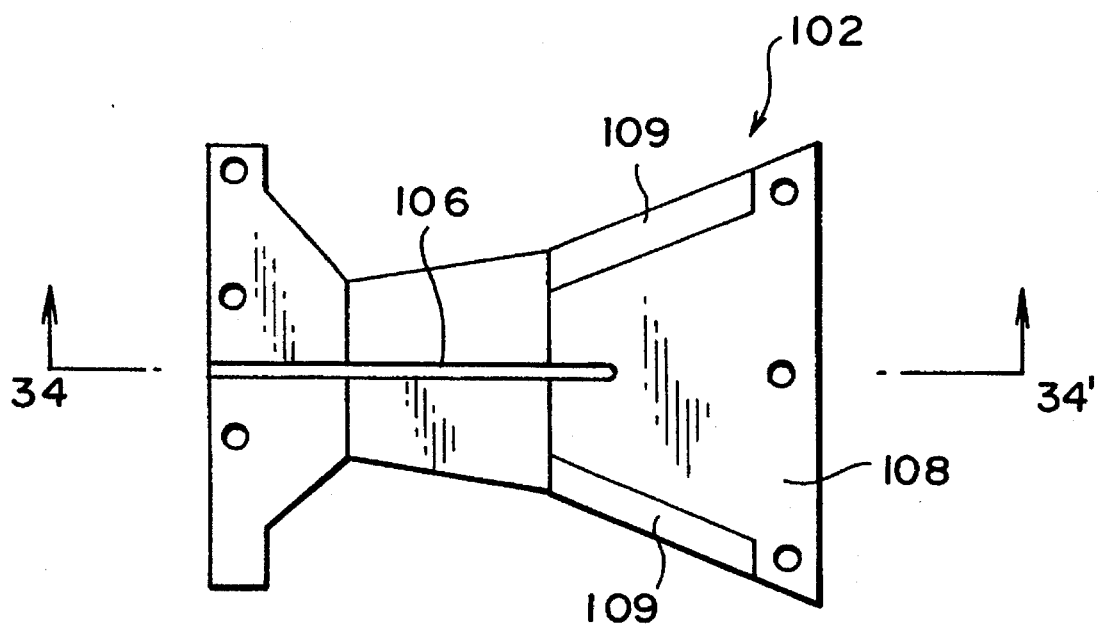
FIG. 33 is a top view of a horizontal flexure which may be used with the mirror assembly in FIG. 31.

FIG. 33 is a top view of horizontal flexure 102. The horizontal flexure 102 may include a rib 106 arranged near the center of the horizontal flexure 102 for stiffening the horizontal flexure.

Figure 34:
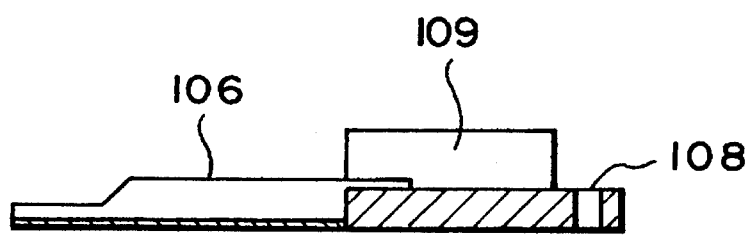
FIG. 34 is a side view of the horizontal flexure of FIG. 33.

FIG. 34 is a sectional view of the horizontal flexure 102 which is taken along section line 34–34' in FIG. 33. The horizontal flexure 102 may include portion 108 for providing increased structural rigidity in the horizontal flexure 102. Portion 108 may include a flange 109 on each side.

Figure 35:
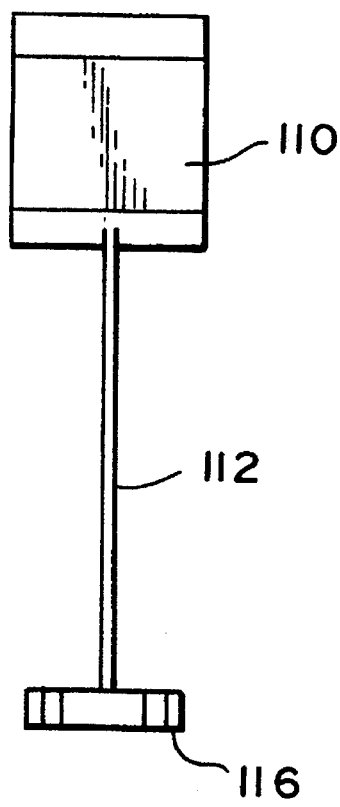
FIG. 35 is a side view of a vertical flexure which may be used with the mirror assembly in FIG. 31.
Figure 36:
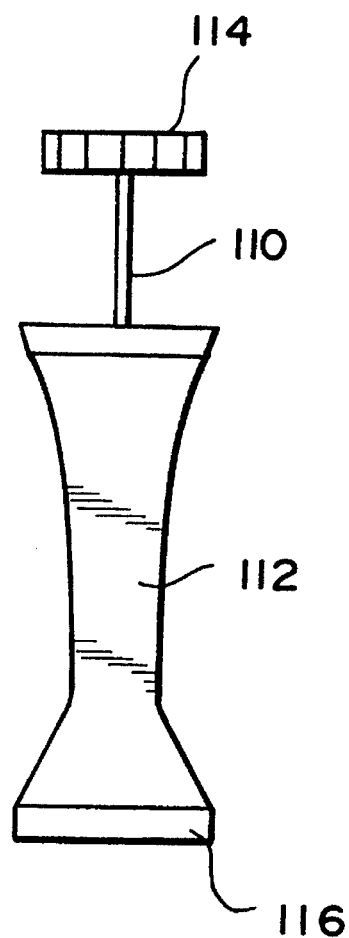
FIG. 36 is another side view of the vertical flexure FIG. 35.

FIGS. 35 and 36 are side views of the vertical flexure 100 which may be used with the mirror assembly 10 in FIG. 31. The vertical flexure may include at least two orthogonally arranged plates which intersect on the same axis. The top plate 110 may be shorter than the bottom plate 112 or vice-versa. The top plate may also have a rectangular profile as illustrated in FIG. 35 while the bottom plate 112 may have an hour glass-shaped profile as illustrated in FIG. 36.

Figure 37:
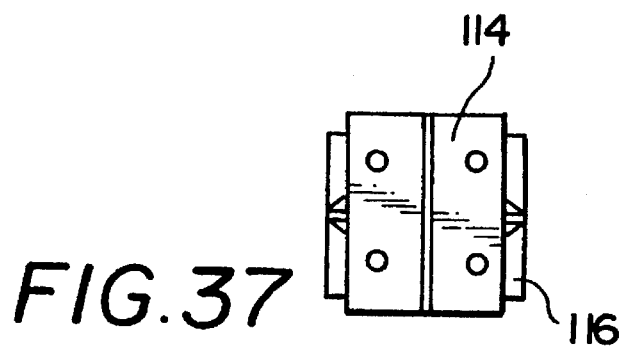
FIG. 37 is a top view of the vertical flexure of FIG. 36.

A top vertical flexure bracket 114 may be provided for securing the top plate 108 to the back side of mirror 20. A bottom vertical flexure bracket 116 may be provided for securing the bottom plate 112 to base 22. As illustrated in the top view of the vertical flexure shown in FIG. 37, the top and bottom vertical flexure brackets 114, 116 may be made from two rectangular blocks which sandwich each side of the top and bottom plates 110, 112.

Figure 38:
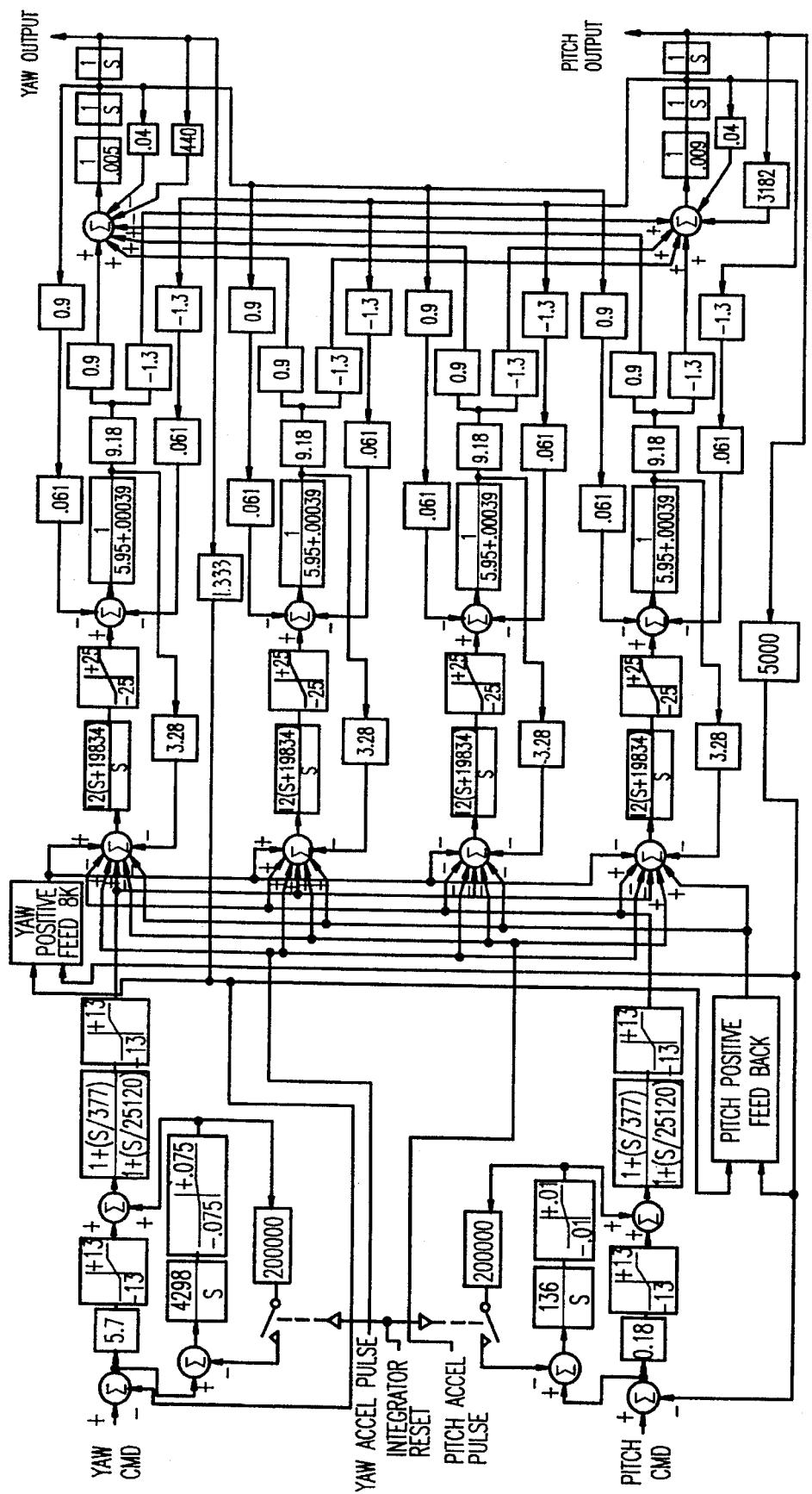
FIG. 38 is a block diagram of a performance model which may be used with the present invention.

FIG. 38 illustrates a block diagram of a performance model (or modle) which may be used with the present invention. This type of control system has been found to be particularly effective for positioning the mirror with four actuators and correcting for line of sight errors. As illustrated in FIG. 38, the inputs for the model are the yaw and pitch commands, yaw and pitch acceleration pulses, and an integrator reset. The outputs for the model are yaw and pitch angular position. The yaw spring rate feedback to the torque summing junction may be set to 3182 in-oz/radian. The yaw position feedback may be set to 133.333 volts/radian. The pitch position feedback may be set to 5000 volts/radian.

It has been found that the spring rates for the mirror support are not necessarily linear, but can be very closely approximated using a cubic function to describe how the flexibility of the mirror assembly 10 changes as it is deflected or rotated in each axis. However, higher order functions, such as fifth order functions, may also be used. Each axis may be given a different spring rate function. The spring rate function for each mirror support may be individually adjusted, or tuned, by selecting the coefficients in the spring rate function using various gains in the performance model.

Spring rate cancellation as well as cross coupling cancellation may be accomplished with conventional curve fitting hardware that resides within the blocks labelled yaw and pitch positive feedback. The yaw and pitch acceleration pulse junctions may be used to apply a scale factor to each of the actuators in order to balance any small differences in the input/output characteristics of each of the actuators. For example, the mirror assembly 10 may be given a command to scan along straight lines perpendicular to the yaw and pitch axes. Any actual deviations from the intended scan direction may be corrected using an appropriate set of pulses which may be defined for each mirror assembly 10. In general terms, the performance model is analogous to putting a negative electromagnetic spring in parallel with the mechanical spring of the mirror support so that the resulting combined spring rate is very close to zero.

The principles, preferred embodiments, and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the invention as defined by the following claims.

I claim:

1. A support for a fast steering/scanning mirror, comprising:

a base;

two horizontal flexures arranged generally parallel to each other, each of said flexures having two end portions which are secured to said base and a middle portion between said end portions which is secured to the mirror; and a vertical flexure secured to said base at one end and pivotally secured to the mirror between said two horizontal flexures at another end, said vertical flexure including at least two plates which are orthogonally arranged to intersect on the same axis.

2. A support as claimed in claim 1 having a first natural vibrational mode with respect to rotation around each of two perpendicular axes that is less than 30 Hertz and a second natural vibrational mode with respect to rotation around each of said two perpendicular axes that is at least 2,000 Hertz.

3. A support as claimed in claim 2 having a natural vibrational mode with respect to rotation around a third axis which is perpendicular to said two axes that is at least 2,000 Hertz.

4. A support as claimed in claim 3 having a first natural vibrational mode with respect to translation along each of said axes that is at least 2,000 Hertz.

5. A support as claimed in claim 1, wherein said vertical flexure is adhesively bonded to the mirror.

6. A support as claimed in claim 1, wherein at least one of said plates has a profile which is narrower at a middle portion than at an end portion of said at least one plate.

7. A support as claimed in claim 1, further comprising bottom means for stiffening said vertical flexure where said vertical flexure is secured to said base.

8. A support as claimed in claim 7, wherein said bottom means includes a U-shaped bracket arranged on said vertical flexure.

9. A support as claimed in claim 1, further comprising middle means for stiffening said vertical flexure where said orthogonally arranged plates intersect.

10. A support as claimed in claim 9, wherein said middle stiffening means includes at least one L-shaped member arranged in a corner formed where said orthogonally arranged plates intersect.

11. A support as claimed in claim 1 wherein at least one of said two horizontal flextures includes means for increasing a rigidity of said at least one horizontal flexture as said at least one horizontal flexture is rotated.

12. A support as claimed in claim 11 wherein said rigidity increasing means includes a plate with a mustache-shaped edge.

13. A support as claimed in claim 12 wherein said mustache-shaped edge includes a straight portion near a middle of said at least one horizontal flexure which is joined at each end by slanted portions which are joined at each end by curved portions.

14. A support as claimed in claim 11 wherein said rigidity increasing means includes at least one folded edge on flat plate which is opposite from said mustache-shaped edge.

15. A support as claimed in claim 1 wherein at least one of said two horizontal flexures includes a middle bracket for securing said at least one horizontal flexure to the mirror.

16. A support as claimed in claim 1 wherein at least one of said two horizontal flexures includes at least one end bracket for securing said at least one horizontal flexure to said base.

17. A support for a fast steering/scanning mirror, comprising:
   a base having two lugs;
   two horizontal flexures arranged generally parallel to each other, each of said flexures having two end brackets for securing one respective horizontal flexure to said base at said lugs and a middle bracket between said end brackets for securing said horizontal flexure to the mirror; and
   a vertical flexure secured to said base at one end and pivotally secured with adhesive to the mirror between said two horizontal flexures at another end, said vertical flexure including at least two plates which are orthogonally arranged on the same axis, at least one of said plates having a profile which is narrower at a middle portion than at an end portion of said at least one plate.

18. A support as claimed in claim 17 having a first natural vibrational mode with respect to rotation around each of two perpendicular axes that is less than 30 Hertz, a second natural vibrational mode with respect to rotation around each of said two perpendicular axes that is at least 2,000 Hertz, and a natural vibrational mode with respect to rotation around a third axis which is perpendicular to said two axes that is at least 2,000 Hertz, and a first natural vibrational mode with respect to translation in each axis which is at least 2,000 Hertz.

19. A support as claimed in claim 17 wherein each of said horizontal flexures includes a mustache-shaped edge having a straight portion near a middle of the horizontal flexure which is joined by a slanted portion at each end which is joined at each end by a curved portion and also having at least one folded edged opposite said mustache-shaped edge.

20. A support for a fast steering/scanning mirror, comprising:
   a base;
   at least one horizontal flexure secured to said base at two ends and also secured to the mirror between said two ends of said at least one horizontal flexure; and
   a vertical flexure secured to said base and pivotally secured to said mirror.

21. A support as claimed in claim 20 wherein said vertical flexure extends from said base and for pivotally supports said mirror over said base.

22. A support as claimed in claim 20 having a first natural vibrational mode with respect to rotation around each of two perpendicular axes that is less than 30 Hertz and a second natural vibrational mode with respect to rotation around each of said two perpendicular axes that is at least 2,000 Hertz.

23. A support as claimed in claim 22 having a natural vibrational mode with respect to rotation around a third axis which is perpendicular to said two axes that is at least 2,000 Hertz.

24. A support as claimed in claim 23 having a first natural vibrational mode with respect to translation along each axis which is at least 2,000 Hertz.

25. A support as claimed in claim 20, wherein said vertical flexure is adhesively bonded to the mirror.

26. A support as claimed in claim 20, wherein said vertical flexure includes at least two orthogonally arranged plates which intersect on the same axis.

27. A support as claimed in claim 26, wherein at least one of said plates has a profile which is narrower at a middle portion than at an end portion of said at least one plate.

28. A support as claimed in claim 20, further comprising bottom stiffening means for stiffening said vertical flexure where said vertical flexure is secured to said base.

29. A support as claimed in claim 28, wherein said bottom stiffening means includes a U-shaped bracket arranged on said vertical flexure.

30. A support as claimed in claim 29, further comprising middle stiffening means for stiffening said vertical flexure where said orthogonally arranged plates intersect on the same axis.

31. A support as claimed in claim 30, wherein said middle stiffening means includes at least one L-shaped member arranged in a corner formed where said orthogonally arranged plates intersect.

32. A support as claimed in claim 20 wherein said at least one horizontal flexure includes rigidity increasing means for increasing a rigidity of said at least one horizontal flexure as said at least one horizontal flexure is rotated.

33. A support as claimed in claim 32 wherein said rigidity increasing means includes a plate with a mustache-shaped edge.

34. A support as claimed in claim 33 wherein said mustache-shaped edge includes a straight portion near a middle of the horizontal flexure which is joined at each end by slanted portions, said slanted portions being joined at each end by a curved portion.

35. A support as claimed in claim 33 wherein said rigidity increasing means includes at least one folded edge on said plate which is opposite from said mustache-shaped edge.

36. A support as claimed in claim 20 wherein said at least one horizontal flexure includes a middle bracket for securing said at least one horizontal flexure to said mirror.

37. A support as claimed in claim 20 wherein said at least one horizontal flexure includes at least one end bracket for securing said at least one horizontal flexure to said base.

* * * * *

UNITED STATES PATENT AND TRADEMARK OFFICE
CERTIFICATE OF CORRECTION

PATENT NO. : 5,550,669

DATED : August 27, 1996

INVENTOR(S) : Bhikhu PATEL

It is certified that error appears in the above-identified patent and that said Letters Patent is hereby corrected as shown below:

In the Title, insert a --/-- between "STEERING" and "SCANNING".
Col. 12,
In Claim 11, line 2, amend "flextures" to --flexures--.

line 3, amend "flexture" to --flexure--; and

Line 4, amend "flexture" to --flexure--.

Signed and Sealed this

Twenty-fifth Day of February, 1997

Attest:

BRUCE LEHMAN

*Attesting Officer*       *Commissioner of Patents and Trademarks*